United States Patent
Zhang et al.

(10) Patent No.: US 9,469,820 B2
(45) Date of Patent: Oct. 18, 2016

(54) METHOD AND SYSTEM FOR RECYCLING CARBON DIOXIDE FROM BIOMASS GASIFICATION

(71) Applicant: Wuhan Kaidi Engineering Technology Research Institute Co., Ltd., Wuhan (CN)

(72) Inventors: Yanfeng Zhang, Wuhan (CN); Liang Zhang, Wuhan (CN); Minggui Xia, Wuhan (CN); Wenyan Liu, Wuhan (CN)

(73) Assignee: WUHAN KAIDI ENGINEERING TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 14/607,020

(22) Filed: Jan. 27, 2015

(65) Prior Publication Data

US 2015/0141536 A1    May 21, 2015

Related U.S. Application Data

(63) Continuation-in-part of application No. PCT/CN2013/079230, filed on Jul. 11, 2013.

(30) Foreign Application Priority Data

Aug. 9, 2012   (CN) .......................... 2012 1 0282152

(51) Int. Cl.
  *C10J 3/72*   (2006.01)
  *C10K 1/00*   (2006.01)
  *C10K 1/02*   (2006.01)
  (Continued)

(52) U.S. Cl.
  CPC .. *C10J 3/72* (2013.01); *C10G 2/32* (2013.01); *C10J 3/482* (2013.01); *C10K 1/004* (2013.01);
  (Continued)

(58) Field of Classification Search
  CPC .............. C10G 2300/1011; C10G 2300/1022; C10G 2/32; Y02E 50/32; C10K 1/004; C10K 1/02; C10K 3/04; C10J 3/482; C10J 2300/1861; C10J 2300/1884
  USPC .................................................. 518/700, 702
  See application file for complete search history.

(56) References Cited

U.S. PATENT DOCUMENTS

| | | | | |
|---|---|---|---|---|
| 5,937,652 A | * | 8/1999 | Abdelmalek | C10J 3/54 60/648 |
| 2010/0258429 A1 | * | 10/2010 | Ugolin | B01J 8/0055 204/157.43 |
| 2011/0016788 A1 | * | 1/2011 | Thacker | C10J 3/86 48/76 |

OTHER PUBLICATIONS

Butterman et al., syngas production via carbon dioxide enhanced gasification of biomass fuels, (Environmental Engineering Science vol. 26, No. 4, 20090, pp. 703-714).*

*Primary Examiner* — Jafar Parsa
(74) *Attorney, Agent, or Firm* — Matthias Scholl P.C.; Matthias Scholl

(57) ABSTRACT

A method for recycling carbon dioxide from biomass gasification. The method includes: 1) employing carbon dioxide as a gasifying agent, allowing the carbon dioxide to gasify biomass to yield syngas; 2) cooling the syngas; 3) introduced cooled syngas to a cyclone separator and a gas scrubber for dust removal and purification; 4) allowing purified syngas in 3) to react with the vapor to modify a ratio of hydrogen to carbon monoxide of the syngas; 5) desulfurizing modified syngas to remove $H_2S$ and COS therein; 6) decarburizing desulfurized syngas to separate carbon dioxide therein; 7) introducing desulfurized and decarburized syngas to a synthesizing tower to yield oil products and exhaust gas including carbon dioxide; 8) decarburizing the exhaust gas including carbon dioxide and separating the carbon dioxide; and 9) introducing the carbon dioxide separated in 6) and 8) to 1) as the gasifying agent for gasification.

10 Claims, 2 Drawing Sheets

(51) Int. Cl.
*C10K 3/04* (2006.01)
*C10G 2/00* (2006.01)
*C10J 3/48* (2006.01)

(52) U.S. Cl.
CPC . *C10K 1/02* (2013.01); *C10K 3/04* (2013.01); *C10G 2300/1011* (2013.01); *C10J 2200/15* (2013.01); *C10J 2300/0916* (2013.01); *C10J 2300/0969* (2013.01); *C10J 2300/1238* (2013.01); *C10J 2300/1659* (2013.01); *C10J 2300/1693* (2013.01); *C10J 2300/1815* (2013.01); *C10J 2300/1861* (2013.01); *C10J 2300/1884* (2013.01); *C10J 2300/1892* (2013.01); *Y02E 50/32* (2013.01); *Y02P 20/129* (2015.11); *Y02P 20/134* (2015.11); *Y02P 20/145* (2015.11); *Y02P 30/20* (2015.11)

METHOD AND SYSTEM FOR RECYCLING CARBON DIOXIDE FROM BIOMASS GASIFICATION

CROSS-REFERENCE TO RELATED APPLICATIONS

This application is a continuation-in-part of International Patent Application No. PCT/CN2013/079230 with an international filing date of Jul. 11, 2013, designating the United States, now pending, and further claims priority benefits to Chinese Patent Application No. 201210282152.6 filed Aug. 9, 2012. The contents of all of the aforementioned applications, including any intervening amendments thereto, are incorporated herein by reference.

BACKGROUND OF THE INVENTION

1. Field of the Invention

The invention relates to a method and system for recycling carbon dioxide from biomass gasification.

2. Description of the Related Art

Conventional methods and systems for gasification of biomass consume oxygen and natural gas, so that the $CO_2$ conversion is low, the energy consumption is large, and the process flow is complex.

SUMMARY OF THE INVENTION

In view of the above-described problems, it is one objective of the invention to provide a method and system for recycling carbon dioxide from biomass gasification. The system has high material conversion and no oxygen consumption. The method has simple process flow and zero carbon dioxide emission.

To achieve the above objective, in accordance with one embodiment of the invention, there is provided a method for recycling carbon dioxide from biomass gasification, the method comprising:

1) employing carbon dioxide as a gasifying agent, allowing the carbon dioxide to gasify biomass in a gasifier in the presence of external auxiliary energy, whereby yielding syngas comprising CO, $CO_2$, $CH_4$, $H_2$, $H_2O$, $H_2S$, and COS, wherein the gasifying agent carbon dioxide is collected from following steps:
2) cooling the syngas using a primary heat exchanger and a secondary heat exchanger in sequence, wherein the primary heat exchanger employs carbon dioxide as a cooling medium whereby preheating the carbon dioxide as the gasifying agent in 1), and the secondary heat exchanger employs water as a cooling medium whereby producing vapor;
3) introduced cooled syngas in 2) to a cyclone separator and a gas scrubber for dust removal and purification;
4) allowing purified syngas in 3) to react with the vapor so that part of carbon monoxide of the syngas is transformed into hydrogen and carbon dioxide, whereby modifying a ratio of hydrogen to carbon monoxide of the syngas;
5) desulfurizing modified syngas to remove $H_2S$ and COS therein;
6) decarburizing desulfurized syngas to separate carbon dioxide therein;
7) introducing desulfurized and decarburized syngas to a synthesizing tower where the desulfurized and desulfurized syngas is catalyzed to yield oil products and exhaust gas comprising carbon dioxide;
8) decarburizing the exhaust gas comprising carbon dioxide and separating the carbon dioxide, and discharging effluent gas free of carbon dioxide; and
9) introducing the carbon dioxide separated in 6) and 8) to the primary heat exchanger as the cooling medium in 2) whereby preheating the carbon dioxide, and transporting the preheated carbon dioxide to 1) as the gasifying agent for gasification.

In a class of this embodiment, a gasification temperature is between 600 and 1300° C., and an outlet temperature of the syngas is between 700 and 1100° C. Preferably, the gasification temperature is between 850 and 1250° C., and the outlet temperature of the syngas is between 850 and 1100° C.

In a class of this embodiment, the external auxiliary energy is plasma torch, microwave energy, solar energy, laser energy, electric induction energy, or a mixture thereof, and the external auxiliary energy accounts for 10-30% of the total energy of fuel fed to the gasifier in unit time.

In a class of this embodiment, the external auxiliary energy accounts for 15-20% of the total energy of fuel fed to the gasifier in unit time.

In a class of this embodiment, in 1), a ratio of consumption of the carbon dioxide to a syngas yield is between 0.36 and 0.51 under a unit standard state; the biomass has a particle size of less than 50 mm, and the gasifying agent carbon dioxide has a flow rate of between 30 and 60 m/s. In 2), the gasifying agent carbon dioxide is preheated by the primary heat exchanger to have a temperature of between 350 and 600° C.

In a class of this embodiment, in 4), the ratio of hydrogen to carbon monoxide in the modified syngas is 2:1.

In another aspect, the invention provides a system for recycling carbon dioxide from biomass gasification, the system comprising: a gasifier, a waste heat exchanger, a waste heat boiler, a cyclone separator, a gas scrubber, a shift reactor, a desulfurizing tower, a first decarburizing tower, a synthesizing tower, and a second decarburizing tower.

A syngas outlet of the gasifier is connected to a heat medium inlet of the waste heat exchanger; a heat medium outlet of the waste heat exchanger is connected to a heat source inlet of the waste heat boiler; a heat source outlet of the waste heat boiler is connected to a gas inlet of the cyclone separator; a gas outlet of the cyclone separator is connected to an inlet of the gas scrubber; an outlet of the gas scrubber is connected to a gas inlet of the shift reactor via a compressor; and a vapor outlet of the waste heat boiler is connected to a vapor inlet of the shift reactor.

A vapor outlet of the shift reactor is connected to an inlet of the desulfurizing tower, and an outlet of the desulfurizing tower is connected to an inlet of the first decarburizing tower which is configured for the decarburizing of the syngas; an outlet of the first decarburizing tower is connected to an inlet of the synthesizing tower; an exhaust outlet of the synthesizing tower is connected to an exhaust inlet of the second decarburizing tower which is configured for the decarburizing of the exhaust; $CO_2$ outlets of the first decarburizing tower and the second decarburizing tower are both connected to a cold medium inlet of the waste heat exchanger; and a cold medium outlet of the waste heat exchanger is connected to a gasifying agent entrance of the gasifier.

In a class of this embodiment, the $CO_2$ outlets of the first decarburizing tower and the second decarburizing tower are both connected to an inlet of the gas holder, and an outlet of the gas holder is connected to the cold medium inlet of the waste heat exchanger via a blower.

In a class of this embodiment, the inlet of the gas holder is also connected to a $CO_2$ outlet of a calcinatory.

In a class of this embodiment, an air distributor is disposed in a lower part of the chamber of the gasifier; a wall of the gasifier above the air distributor comprises a primary gasifying agent entrance; the wall of the gasifier below the air distributor comprises an auxiliary gasifying agent entrance; an external auxiliary energy entrance is disposed on the wall of the gasifier above the auxiliary gasifying agent entrance; a cold medium outlet of the waste heat exchanger is connected to both the primary gasifying agent entrance and the auxiliary gasifying agent entrance.

Advantages according to embodiments of the invention is as follows:

1. The method employs carbon dioxide as a cycle medium, consumes zero oxygen, and discharges no carbon dioxide;
2. The method employs carbon dioxide as a gasifying agent, no oxygen involved, thereby supplementing the carbon source, saving the material consumption, and improving the conversion rate of the materials;
3. The invention has no special requirement on the particle size of the materials, the materials merely need crushing, so the operation is easy; and
4. The external auxiliary energy can be supplied in different forms, which is beneficial to the comprehensive utilization of energy.

Figure 1:
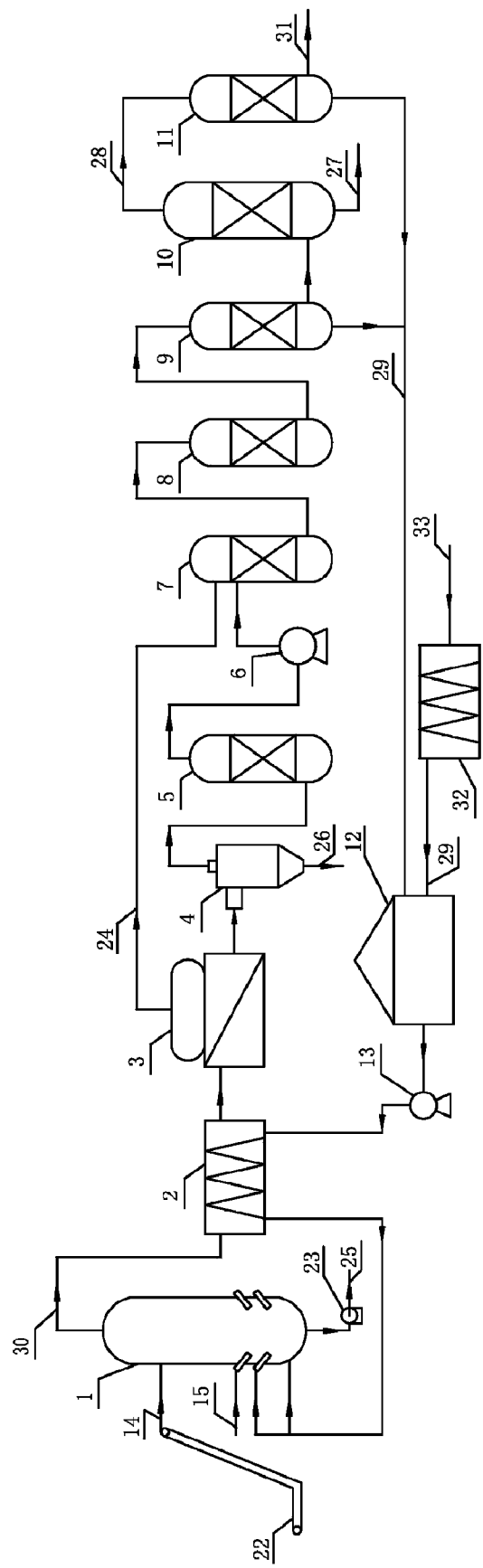
FIG. 1 is a schematic diagram of a system for recycling carbon dioxide from biomass gasification according to one embodiment of the invention.
Figure 2:
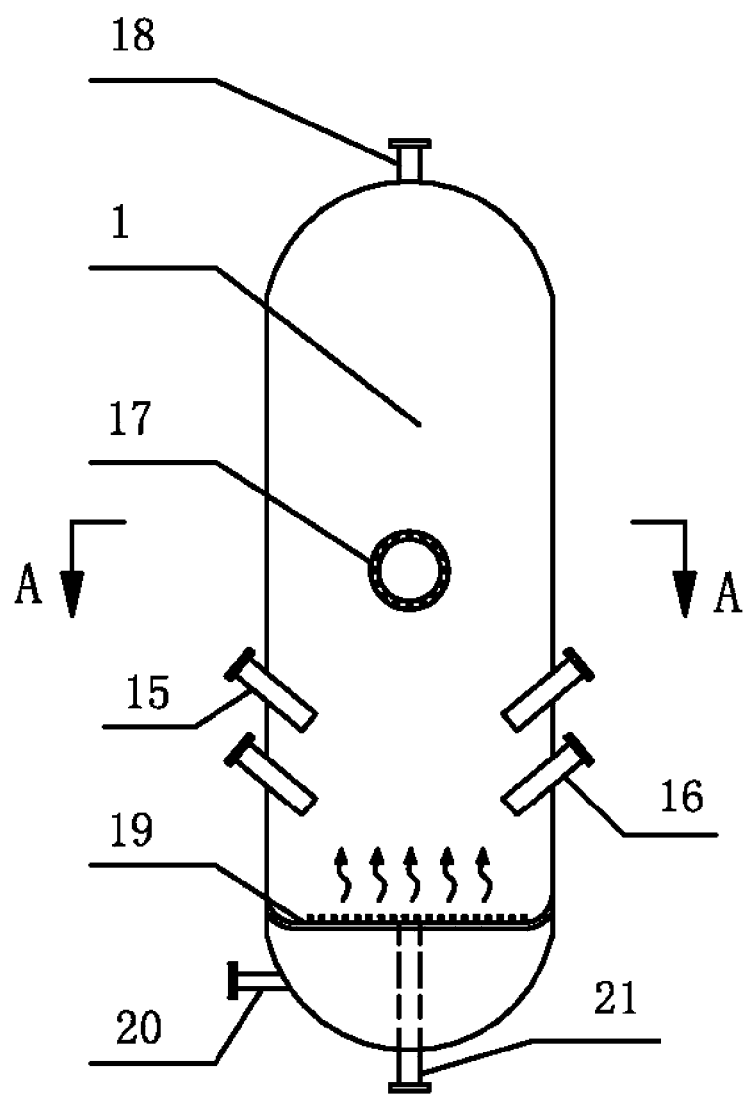
FIG. 2 is a schematic diagram of a gasifier according to one embodiment of the invention.
Figure 3:
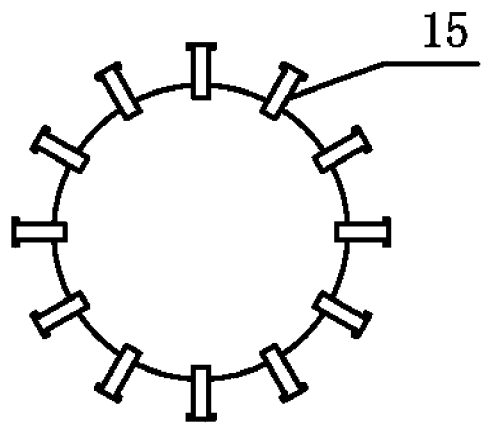
FIG. 3 is a sectional view taken from line A-A in FIG. 2.

In the drawings, the following reference numbers are used: 1. Gasifier; 2. Waste heat exchanger; 3. Waste heat boiler; 4. Cyclone separator; 5. Gas scrubber; 6. Compressor; 7. Shift reactor; 8. Desulfurizing tower; 9. First decarburizing tower; 10. Synthesizing tower; 11. Second decarburizing tower; 12. Gas holder; 13. Blower; 14. Fuel; 15. External auxiliary energy entrance; 16. Auxiliary gasifying agent entrance; 17. Feed inlet; 18. Syngas outlet; 19. Air distributor; 20. Primary gasifying agent entrance; 21. Slag discharging outlet; 22. Feeding device; 23. Slag cooler; 24. Vapor; 25. Cooled slag; 26. Fly ash; 27. Oil product; 28. Exhaust gas; 29. $CO_2$; 30. Syngas; 31. Effluent gas; 32. Calcinator; 33. Limestone.

DETAILED DESCRIPTION OF THE EMBODIMENTS

Technical solution of the invention is illustrated with detailed embodiments hereinbelow, the embodiments, however, should not be explained as limitation of the protection range of the invention.

FIG. 1 is a schematic diagram of a system for recycling carbon dioxide from biomass gasification of the invention in the absence of oxygen. The system comprises a gasifier 1, a waste heat exchanger 2, a waste heat boiler 3, a cyclone separator 4, a gas scrubber 5, a compressor 6, a shift reactor 7, a desulfurizing tower 8, a first decarburizing tower 9, a synthesizing tower 10, and a second decarburizing tower 11. The gasifier 1 comprises a syngas outlet 18 at the top, a slag discharging outlet 21 at the bottom, and a feed inlet 17 in the middle of the external wall of the gasifier. The feed inlet is connected to a feeding device 22. An air distributor 19 is disposed in a lower part of the chamber of the gasifier 1. The wall of the gasifier above the air distributor 19 comprises a primary gasifying agent entrance 20. The wall of the gasifier below the air distributor 19 comprises an auxiliary gasifying agent entrance 16. An external auxiliary energy entrance 15 is disposed on the wall of the gasifier above the auxiliary gasifying agent entrance 16.

The syngas outlet 18 of the gasifier 1 is connected to a heat medium inlet of the waste heat exchanger 2. A heat medium outlet of the waste heat exchanger 2 is connected to a heat source inlet of the waste heat boiler 3. A heat source outlet of the waste heat boiler 3 is connected to a gas inlet of the cyclone separator 4. A gas outlet of the cyclone separator 4 is connected to an inlet of the gas scrubber 5. An outlet of the gas scrubber 5 is connected to a gas inlet of the shift reactor 7 via a compressor 6. A vapor outlet of the waste heat boiler 3 is connected to a vapor inlet of the shift reactor 7.

A vapor outlet of the shift reactor 7 is connected to an inlet of the desulfurizing tower 8, and an outlet of the desulfurizing tower 8 is connected to an inlet of the first decarburizing tower 9 which is configured for the decarburizing of the syngas. An outlet of the first decarburizing tower 9 is connected to an inlet of the synthesizing tower 10. An exhaust outlet of the synthesizing tower 10 is connected to an exhaust inlet of the second decarburizing tower 11 which is configured for the decarburizing of the exhaust. $CO_2$ outlets of the first decarburizing tower 9 and the second decarburizing tower 11 are both connected to a cold medium inlet of the waste heat exchanger 2. A cold medium outlet of the waste heat exchanger 2 is connected to both the primary gasifying agent entrance 20 and the auxiliary gasifying agent entrance 16.

The $CO_2$ outlets of the first decarburizing tower 9 and the second decarburizing tower 11 are both connected to an inlet of the gas holder 12. An outlet of the gas holder 12 is connected to the cold medium inlet of the waste heat exchanger 2 via a blower 13. The inlet of the gas holder 12 is also connected to a $CO_2$ outlet of a calcinator 32.

In this example, solid fuel 14 such as biomass is introduced from the feeding device 22 to the gasifier 1 via the feed inlet 17. The recyclable gasifying agent $CO_2$ is blown into the gasifier 1. There are two routes for the gasifying agent $CO_2$ to enter the gasifier. One is introduced from the primary gasifying agent entrance 20, and then into the gasifier via the air distributor 19; the other is introduced into the gasifier 1 from the auxiliary gasifying agent entrance 16. Meanwhile, external heat energy is introduced to the gasifier via an external auxiliary energy entrance 15. The biomass is gasified in the gasifier 1 under high temperature to yield CO, $CO_2$, $CH_4$, $H_2$ and semicoke. The reaction temperature in the gasifier is controlled at between 600 and 1600° C., so that the semicoke reacts with $CO_2$, the reaction equation is: $C+CO_2=2CO+Q$, with high reaction rate.

Take rice hull and 1 $Nm^3$ of syngas as an example, the auxiliary energy accounts for 15-25% of the total energy of the fed fuel, the reaction temperature is 800° C., the circulating volume of $CO_2$ is 0.51 $Nm^3$, the biomass is 0.48 kg, and the syngas from the outlet of the gasifier comprises 0-55% by volume of CO, 22-28% of $CO_2$, and 6-12% of $H_2$.

The high temperature syngas 30 is discharged from the syngas outlet of the gasifier 1. The cooled slag 25 is discharged from the slag discharging outlet 21 and cooled by a slag cooler 23.

The reaction temperature in the gasifier is controlled at 600-1300° C., preferably at 850-1250° C. The outlet temperature of the syngas is controlled at 800-1100° C. In the gasifier, the carrier gas of the feedstock and the sweeping gas both employ the recyclable $CO_2$. The external auxiliary energy accounts for 15-30% of the total energy of the fed fuel. The external auxiliary energy is any type of energy that can be transformed into heat energy, including but not limited to plasma torch, microwave energy, solar energy, laser energy, electric induction energy. The circulating volume of $CO_2$ can be regulated according to the furnace temperature and fuel category. The flow rate of the gasifying agent passing through the air distributor in the gasifier can be regulated according to the particle size of the fuel, preferably, the particle size of the fuel is below 50 mm, and the flow rate is 30-60 m/s. When the gasifier is operating, the calcinator 32 is also started, and limestone 33 is calcined to yield $CO_2$ to act as starting gas.

To achieve the optimal working conditions and the overall performance of the method, the reaction bed temperature is accurately controlled, and the plasma power and the supplied $CO_2$ are real-time regulated. The above key parameters can be monitored by a monitoring unit disposed at the syngas outlet of the gasifier, or by interlock control, to achieve full automatic operation thereby ensuring the stable running of the system.

The high temperature syngas 30 is then introduced to the waste heat exchanger 2 and exchanges heat with the gasifying agent $CO_2$ 29. Thus, the gasifying agent is preheated by the syngas thereby improving the conversion efficiency of the gasifier. After the primary cooling, the high temperature syngas is further introduced to the waste heat boiler 3 and cooled therein, to yield vapor 24. After the two-stage cooling, the syngas flows into the cyclone separator 4 and the gas scrubber 5 for further cooling and dust removal. The resulting fly ash 26 is collected and discharged. The preheated $CO_2$ has a temperature of 350-600° C.

The cooled and scrubbed syngas is boosted by the compressor 6 and then introduced to the shift reactor 7, where a water gas reaction happens between the syngas and the vapor 24 which is originated from the waste heat boiler 3, thereby achieving the modifying treatment of the syngas and ensuring the full utilization of the reaction products in the whole process.

The modified syngas is introduced to the desulfurizing tower 8 and the first decarburizing tower 9 for desulfurization and decarbonization. The purified syngas from the first decarburizing tower 9 flows into the synthesizing tower 10. $CO_2$ from the first decarburizing tower 9 flows into the gas holder 12 by the help of the residual pressure.

The purified syngas in the synthesizing tower 10 is transformed into oil produces 27 through a catalytic synthesis reaction, together with the generation of exhaust gas 28.

The exhaust gas 28 is introduced to the second decarburizing tower 11 and $CO_2$ 29 is separated. The remained effluent gas 31 free of greenhouse gas is treated and discharged outside. Thus, the process of the invention achieves the zero emission of greenhouse gas.

$CO_2$ from the first decarburizing tower 9 and the second decarburizing tower 11 are both introduced to the gas holder 12, blown by the blower 13 and transported to the gasifier 1 via the primary gasifying agent entrance 20 and the auxiliary gasifying agent entrance 16, and then the next cycle of gasification starts.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of biomass gasification by utilizing carbon dioxide as a gasifying agent, the method comprising:
   1) allowing the carbon dioxide to gasify biomass in a gasifier in the presence of external energy, whereby yielding syngas comprising CO, $CO_2$, $CH_4$, $H_2$, $H_2O$, $H_2S$, and COS;
   2) cooling the syngas from 1) in a primary heat exchanger by using carbon dioxide as a cooling medium, whereby the carbon dioxide is heated by the syngas to a temperature of between 350 and 600° C.;
   3) cooling the syngas from 2) in a secondary heat exchanger by using water as a cooling medium whereby producing water vapor;
   4) feeding carbon dioxide from 2) to the gasifier;
   5) introducing the syngas from 3) to a cyclone separator and a gas scrubber for dust removal and purification;
   6) contacting the syngas from 5) with the water vapor so that part of carbon monoxide in the syngas reacts with the water vapor to produce hydrogen and carbon dioxide;
   7) removing $H_2S$ and COS from the syngas from 6) to obtain a desulfurized syngas;
   8) removing carbon dioxide from the desulfurized syngas to obtain a desulfurized and decarburized syngas;
   9) introducing the desulfurized and decarburized syngas to a synthesizing tower, wherein the desulfurized and decarburized syngas is catalyzed to yield oil and exhaust gas comprising carbon dioxide;
   10) separating carbon dioxide from the exhaust gas from 9) to obtain an effluent gas free of carbon dioxide, and discharging the effluent gas; and
   11) introducing the carbon dioxide obtained in 8) and the carbon dioxide obtained in 10) to the primary heat exchanger as the cooling medium.

2. The method of claim 1, wherein in 1), a gasification temperature is between 600 and 1300° C., and an outlet temperature of the syngas is between 700 and 1100° C.

3. The method of claim 2, wherein in 1), the gasification temperature is between 850 and 1250° C., and the outlet temperature of the syngas is between 850 and 1100° C.

4. The method of claim 1, wherein the external energy is plasma torch, microwave energy, solar energy, laser energy, electric induction energy, or a mixture thereof, and the external energy fed to the gasifier in a unit time accounts for 10-30% of the total energy of fuel fed to the gasifier in the unit time.

5. The method of claim 3, wherein the external energy is plasma torch, microwave energy, solar energy, laser energy, electric induction energy, or a mixture thereof, and the external energy fed to the gasifier in a unit time accounts for 10-30% of the total energy of fuel fed to the gasifier in the unit time.

6. The method of claim 4, wherein the external energy fed to the gasifier in a unit time accounts for 15-20% of the total energy of fuel fed to the gasifier in the unit time.

7. The method of claim 5, wherein the external energy fed to the gasifier in a unit time accounts for 15-20% of the total energy of fuel fed to the gasifier in the unit time.

8. The method of claim 1, wherein in 1), a ratio of the carbon dioxide to the syngas is between 0.36 and 0.51.

9. The method of claim 1, wherein in 1), the biomass has a particle size of less than 50 mm, and the carbon dioxide has a flow rate of between 30 and 60 m/s.

10. The method of claim 1, wherein in 6), a ratio of hydrogen to carbon monoxide in the syngas is 2:1 after part of carbon monoxide of in the syngas reacts with the water vapor.

* * * * *